US012547488B2

(12) United States Patent
Gupta

(10) Patent No.: US 12,547,488 B2
(45) Date of Patent: Feb. 10, 2026

(54) SELF DIAGNOSTIC AND HEALING OF ENTERPRISE NODES THROUGH A SOCIAL MEDIA FABRIC

(71) Applicant: American Megatrends International, LLC, Duluth, GA (US)

(72) Inventor: Chitrak Gupta, Johns Creek, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 0 days.

(21) Appl. No.: 18/672,872

(22) Filed: May 23, 2024

(65) Prior Publication Data

US 2025/0362997 A1 Nov. 27, 2025

(51) Int. Cl.
*G06F 11/07* (2006.01)
*G06Q 50/00* (2012.01)

(52) U.S. Cl.
CPC ...... *G06F 11/0793* (2013.01); *G06F 11/0751* (2013.01); *G06F 11/0784* (2013.01); *G06Q 50/01* (2013.01)

(58) Field of Classification Search
CPC ............. G06F 11/0793; G06F 11/0751; G06F 11/0784
See application file for complete search history.

(56) References Cited

U.S. PATENT DOCUMENTS

| | | | | |
|---|---|---|---|---|
| 2005/0015273 A1* | 1/2005 | Iyer | G06Q 30/012 | 705/302 |
| 2015/0163103 A1* | 6/2015 | Bodine | G06F 11/0709 | 709/224 |
| 2022/0019496 A1* | 1/2022 | Lozano | G06F 11/0778 | |
| 2022/0156134 A1* | 5/2022 | Lehmann | G06F 11/3476 | |
| 2022/0206891 A1* | 6/2022 | Ting | G06F 11/0769 | |
| 2022/0382611 A1* | 12/2022 | Kapish | G06F 11/0709 | |
| 2023/0126147 A1* | 4/2023 | Nowak | G06F 11/0793 | 714/2 |
| 2023/0161659 A1* | 5/2023 | Misra | G06F 11/079 | 714/48 |
| 2023/0195560 A1* | 6/2023 | Haririan | G06F 11/0772 | 714/26 |
| 2023/0259419 A1* | 8/2023 | Seck | G06F 11/0793 | 714/26 |

* cited by examiner

*Primary Examiner* — Yolanda L Wilson
(74) *Attorney, Agent, or Firm* — TROUTMAN PEPPER LOCKE LLP; Tim Tingkang Xia, ESQ.

(57) ABSTRACT

A BMC detects an error within the host computer system. The BMC automatically generates an error message that includes an error code and a description of the error. The BMC transmits the error message to a device social network configured to facilitate communication between computing devices and a support cloud, when the error message is allowed to be automatically submitted to the device social network. The BMC receives a response message from the device social network. The response message includes at least one of a solution to the error and a notification regarding the error.

19 Claims, 7 Drawing Sheets

SELF DIAGNOSTIC AND HEALING OF ENTERPRISE NODES THROUGH A SOCIAL MEDIA FABRIC

BACKGROUND

Field

The present disclosure relates generally to computer systems, and more particularly, to techniques of using a device-based social network to enable automated problem resolution and healing of computer systems through integration with a cloud-based support infrastructure.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC detects an error within a host computer system. The BMC automatically generates an error message that includes an error code and a description of the error. The BMC transmits the error message to a device social network configured to facilitate communication between computing devices and a support cloud, when the error message is allowed to be automatically submitted to the device social network. The BMC receives a response message from the device social network. The response message includes at least one of a solution to the error and a notification regarding the error.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
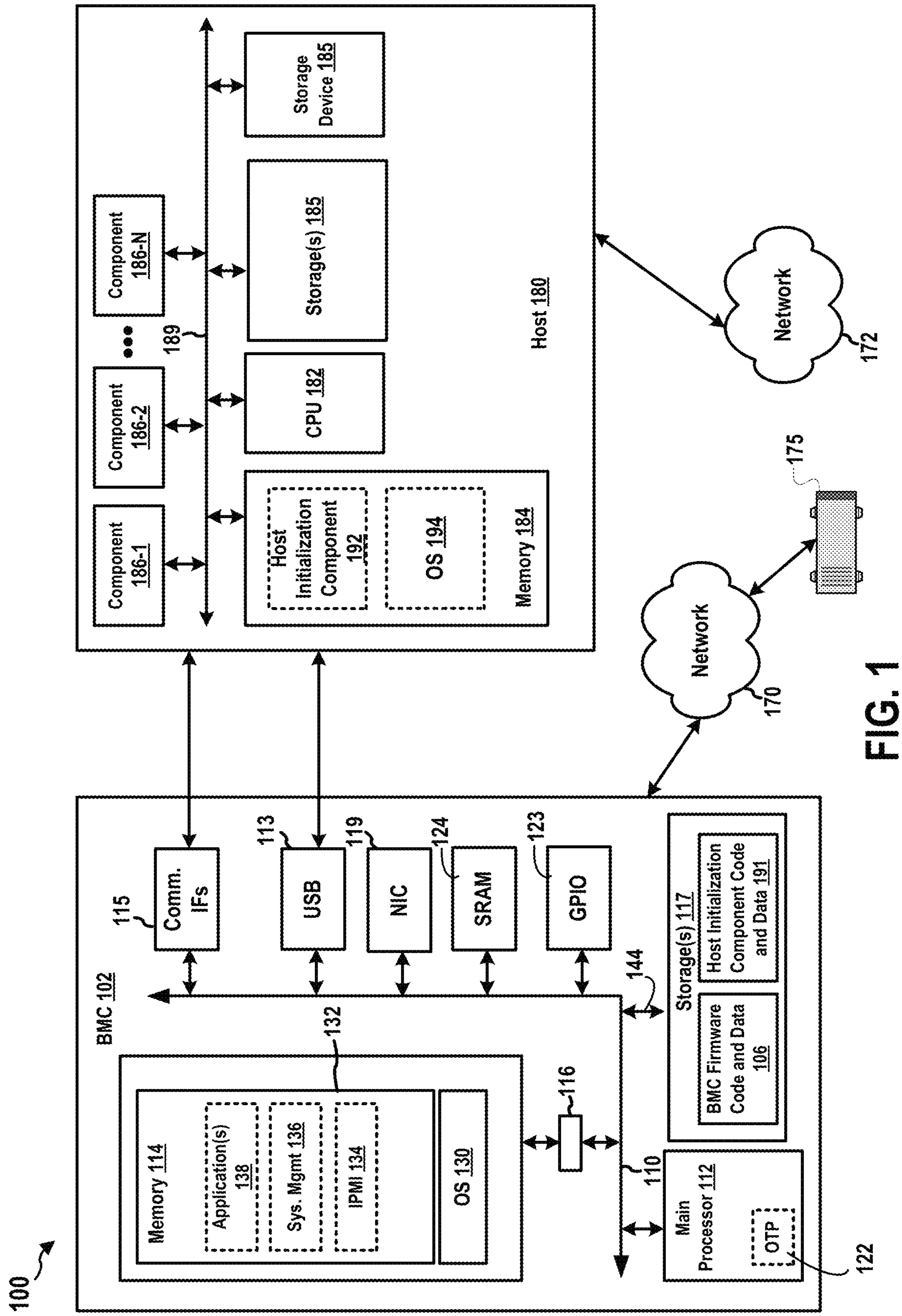
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the main processing unit 112 contains an OTP memory 122 (i.e., one time programmable memory).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 a BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144.

Support information is an essential requirement for all users of computing devices. Manufacturers of computing devices make various methods available to provide reliable support to their users, as the availability of on-demand technical support is a unique selling point and an important criterion in the decision to purchase a computing device.

Currently, technical support is provided to users through several methods, each with varying levels of reliability:

- Warranty-driven personalized customer support—the most reliable method
- Technical documentation for self-help troubleshooting—reliable but requires the customer to search for relevant information
- User forums for crowdsourcing troubleshooting and support information—may provide support but is not very reliable
- General blog posts and internet searches—data-heavy but very unreliable for troubleshooting specific problems The quality of technical support is important, but the way it is provided is equally crucial. A high percentage of customers prefer to receive technical solutions to their problems without spending significant time on the issue and, importantly, without human intervention.

The proposed solution aims to unify all available troubleshooting mechanisms of user interaction in a consumer or enterprise fabric by leveraging the power of device social media platforms and integrating them into the Firmware Provider cloud offering. This approach seeks to enhance the customer experience in troubleshooting and expedite the resolution of customer issues through a tight integration of Original Equipment Manufacturer (OEM) computing devices with device social media platforms, enabling real-time issue resolution.

The proposed solution provides automated resolutions to customer issues with minimal human intervention using public and private device social media platforms. This will be achieved by creating a low-touch environment where systems communicate with Firmware Provider on device social media platforms to help end-users and Original Design Manufacturer (ODM)/OEM customers resolve issues efficiently.

The proposed method of issue resolution covers the following scenarios:

- Generating, formatting, and broadcasting messages on access-controlled device social media platforms for various open support groups and processing them in the Firmware Provider support framework.
- Responding to issues automatically based on generated error codes.
- Identifying trending issues on a particular type of system.
- Providing data automatically and in real-time to support engineers and other Firmware Provider support teams to analyze issues that customers are facing.
- Leveraging features and functionality of social media platforms to resolve customer issues quickly.
- Troubleshooting issues effectively.

The proposed solution introduces a new paradigm in technical support, where devices are connected in a device social media fabric specifically designed for Firmware Provider's support network. This fabric is distinct from existing social media platforms for humans and is tailored to facilitate communication between devices and the Firmware Provider support infrastructure.

In this model, every device under the support of the Firmware Provider cloud is provided with a unique device social media handle, allowing the cloud to reach any node using the format @<cloud-namespace>/@<node-name>. For example, @ODM-2/@srv-1 would be the identifier for Server 1 under ODM-2 support.

The system will provide multi-level support, with ODMs offering Level-1 support and escalating issues to the Firmware Provider cloud for higher-level support when necessary. The Firmware Provider support cloud services will push command resolutions, e.g., in textual or script form, to the requesting nodes.

To onboard systems to the Firmware Provider support cloud, a factory operation will be implemented. During this process, each system in the factory pipeline will be provided with a service tag binding and registered on the Firmware Provider cloud. Depending on the subscription level for the particular ODM customer, support requests can be routed to the Firmware Provider cloud either by end-user customers or after a first-level diagnostic by the ODM support team.

The Firmware Provider support system can pull information about issues based on support tickets in the device social media platform or tickets raised directly. The group hierarchy within the support network allows for standard issue searches at the first level, while Firmware Provider can provide multi-level support based on subscription, with lower levels reaching out to Sales/Support and higher levels engaging Dev/QA representatives directly for co-debugging.

The ultimate goal is to delight Firmware Provider customers with an excellent technical customer support experience while minimizing human interaction and maximizing the data that Firmware Provider can use to continuously improve its products and services.

Figure 2:
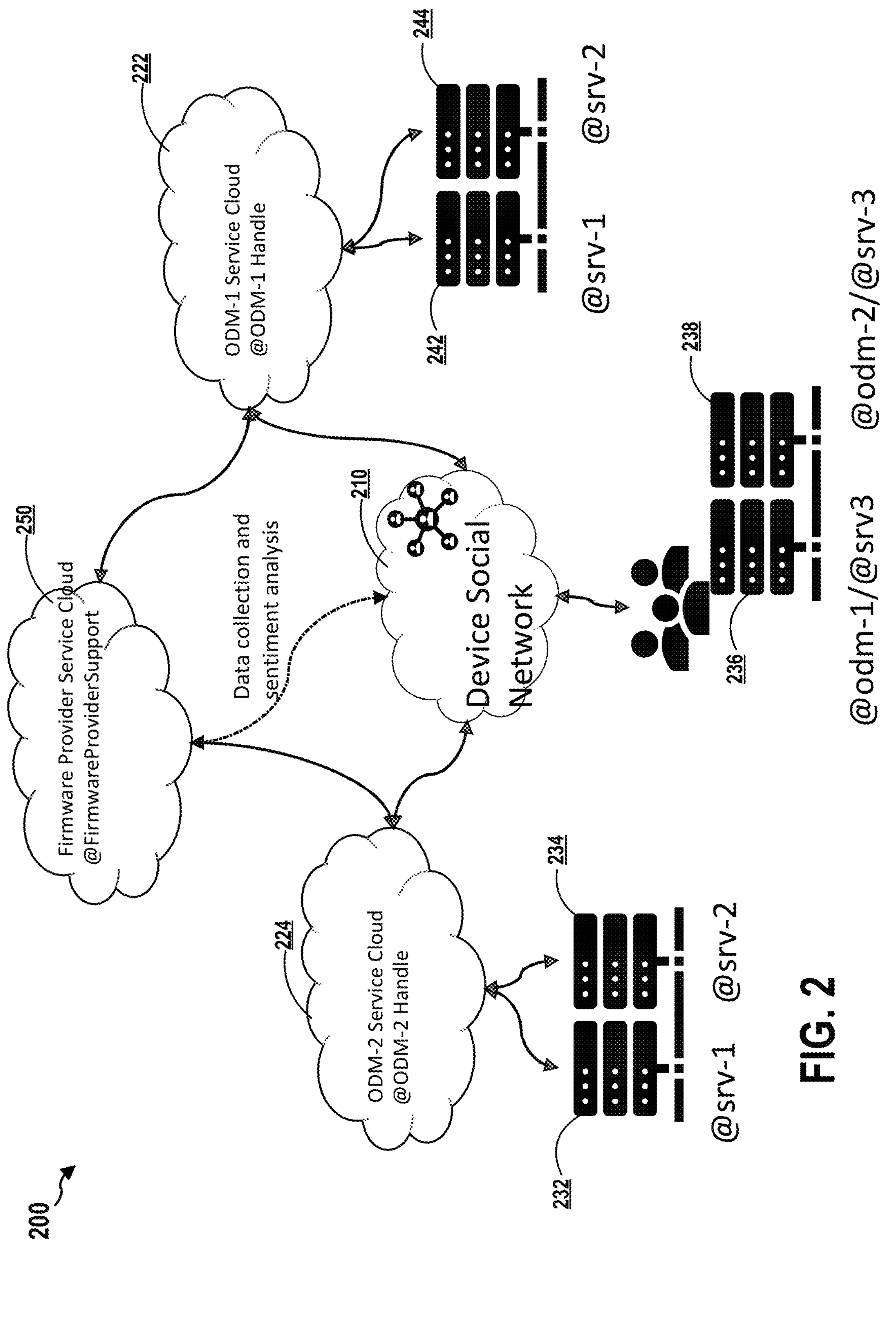
FIG. 2 is a diagram illustrating a device social network that enables self-diagnostic and healing of enterprise nodes.

FIG. 2 is a diagram 200 illustrating a device social network 210 that enables self-diagnostic and healing of enterprise nodes from the Firmware Provider service cloud 250, which is an on-premises or an off-premises cloud. The Firmware Provider service cloud 250 has a handle @FirmwareProviderSupport. In this example, an ODM-1 service cloud 222 and an ODM-2 service cloud 224 are each in communication with the Firmware Provider service cloud 250. The ODM-1 service cloud 222 has a handle @ODM-1 and the ODM-2 service cloud 224 has a handle @ODM-2.

Servers 232 and 234, having handles @odm-2/@srv-1 and @odm-2/@srv-2 respectively, are directly supported by the ODM-2 service cloud 224. Similarly, servers 242 and 244, with handles @odm-1/@srv-1 and @odm-1/@srv-2, are directly supported by the ODM-1 service cloud 222.

Additionally, servers 236 and 238 are located at a user's site and have handles @odm-1/@srv-3 and @odm-2/@srv-3, respectively. These servers 236 and 238 are in communication with the ODM-1 service cloud 222 and the ODM-2 service cloud 224 through the device social network 210.

The device social network 210 provides a unique paradigm where every node under the support of the Firmware Provider service cloud 250 is assigned a social media-like handle. The Firmware Provider service cloud 250 can reach any node using the format @<cloud-namespace>/@<node-name>. For instance, @ODM-2/@srv-1 is the identifier for the server 232 (i.e., srv-1) under ODM-2 support.

This setup allows for multi-level support, with ODM lever service clouds, e.g., the ODM-1 service cloud 222 and the ODM-2 service cloud 224, providing Level-1 support and escalating issues to the Firmware Provider service cloud 250 when necessary. The Firmware Provider service cloud 250 can push command resolutions, either in textual or script form, to the requesting nodes.

The device social network 210 is designed for devices and organizations, not humans. While humans can trigger messages using the device handles, they are not assigned personal handles. This approach minimizes human intervention and facilitates the development of AI models that can process machine-readable formatted data for automated diagnostics and healing of the systems.

The servers 232, 234, 236, 238, 242, and 244 each can be a host computer 180 that include a host CPU 182, a host memory 184, storage device(s) 185, a BMC 102, and component devices 186-1 to 186-N. The hierarchical structure of the device social network 210 allows for a complete tree structure of devices. For simplification, a single layer is used where each server handles its own devices, and not every device in the server requires a handle. The server acts as the master handle, providing information about any devices experiencing issues.

In the event of a problem, a server (e.g., server 236) can broadcast a message on the device social network 210, which is visible to all other servers and the ODM service clouds. The ODM service clouds can first attempt to resolve the issue using existing solutions or manual intervention by their IT teams. If the problem persists, they can escalate it to the Firmware Provider service cloud 250 by mentioning @FirmwareProviderSupport in the message.

The Firmware Provider service cloud 250 can then search for similar resolved issues and push the resolution back to the ODM service clouds, enabling them to resolve the issue independently. This approach improves efficiency, reduces costs for Firmware Provider, and provides quicker response times to the customer.

The device social network 210 serves as a data collection and broadcasting engine, allowing problems to be socialized across multiple ODMs. If ODM-1 encounters and resolves a problem, ODM-3 can benefit from the solution without needing to reach out to Firmware Provider for every similar issue. This sharing of information enhances the overall support experience for the customers.

Figure 3:
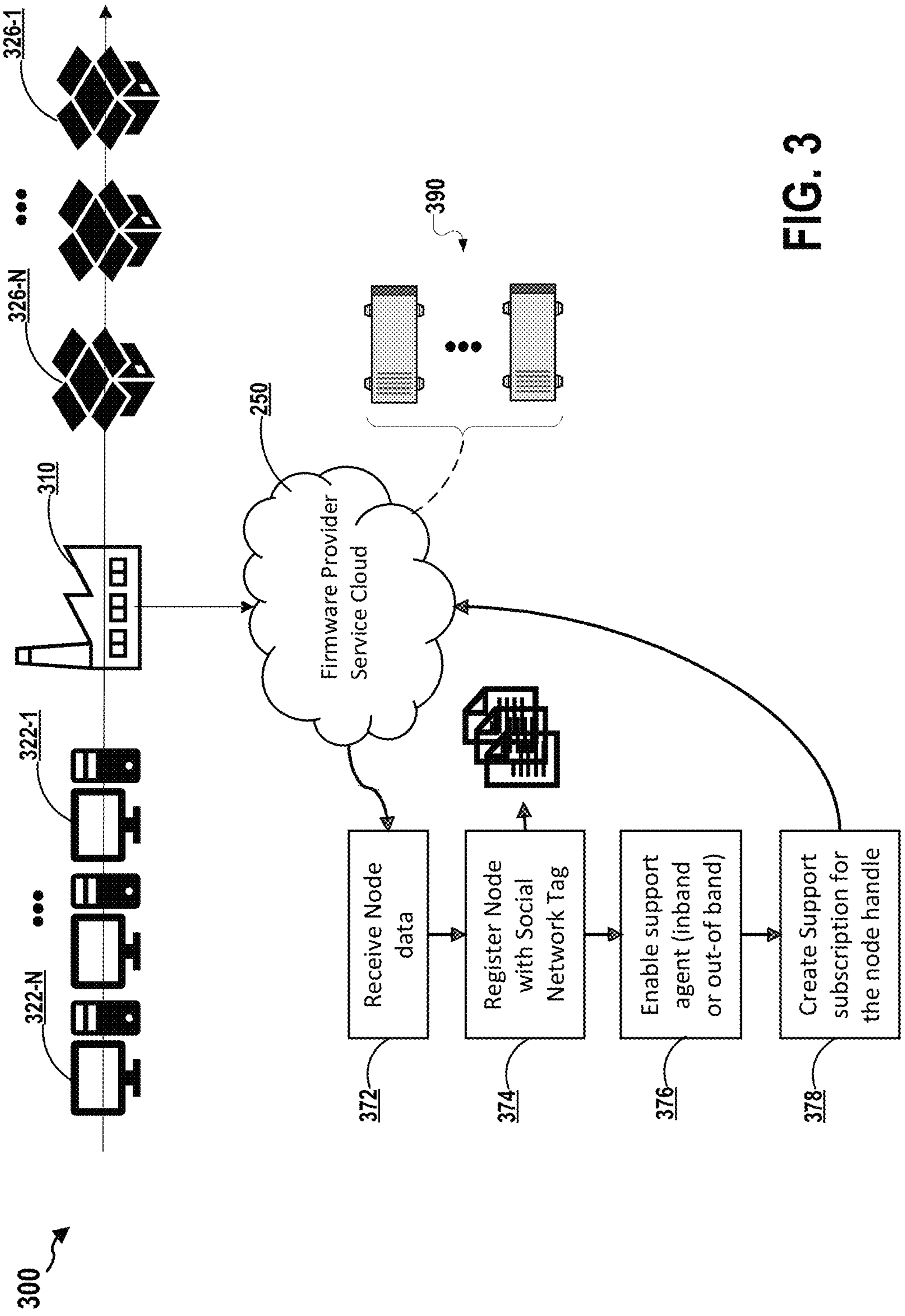
FIG. 3 is a diagram illustrating a factory operation to onboard systems to a Firmware Provider service cloud.

FIG. 3 is a diagram 300 illustrating a factory operation to onboard systems to the Firmware Provider service cloud 250. A manufacturer 310 manufactures computer systems 322-1 . . . 322-N. Each computer system may include a BMC 102, which executes firmware provided by the Firmware Provider. The manufacturer 310 packages the computer systems 322-1 . . . 322-N into end products 326-1 . . . 326-N, which are shipped to the customers. Each system of the computer systems 322-1 . . . 322-N may have a structure and components similar to those of the host computer 180 and/or the BMC 102.

Prior to shipping, each system of the computer systems goes through an onboarding process. In particular, in operation 372, the system receives node data. In operation 374, the system registers each node with a social network tag on the device social network 210. A unique handle is assigned to each computer system in the format @<cloud-namespace>/@<node-name>, as described in FIG. 2. In operation 376, the system enables a support agent, either inband or out-of-band. This support agent facilitates communication between the system and the Firmware Provider service cloud 250 through the device social network 210. The support agent may be executed on a BMC 102 of the system. In operation 378, the system creates a support subscription for each node handle. The subscription level determines how support requests are routed and handled.

Any system in the factory pipeline will be provided with a service tag binding and is registered on the Firmware Provider service cloud 250. This binding enables the system to participate in the device social network 210 and receive support from the Firmware Provider service cloud 250. The Firmware Provider service cloud 250 includes one or more Firmware Provider servers 390, which of which may have a structure and components similar to those of the host computer 180. The one or more Firmware Provider servers 390 provide the functions of the Firmware Provider service cloud 250.

Based on the subscription level for the particular ODM customer, support requests can be routed to the Firmware Provider service cloud 250 either directly by the end-user customers or after a first-level diagnostic by the ODM support team, such as the ODM-1 service cloud 222 or the ODM-2 service cloud 224.

The Firmware Provider support team can obtain information about issues based on the support tickets created in the device social network 210 or tickets raised directly. This allows for efficient problem resolution and data collection for further analysis and product improvement.

By onboarding systems through this factory operation, the manufacturer 310 registers each shipped product and equips the product to participate in the device social network 210.

Figure 4:
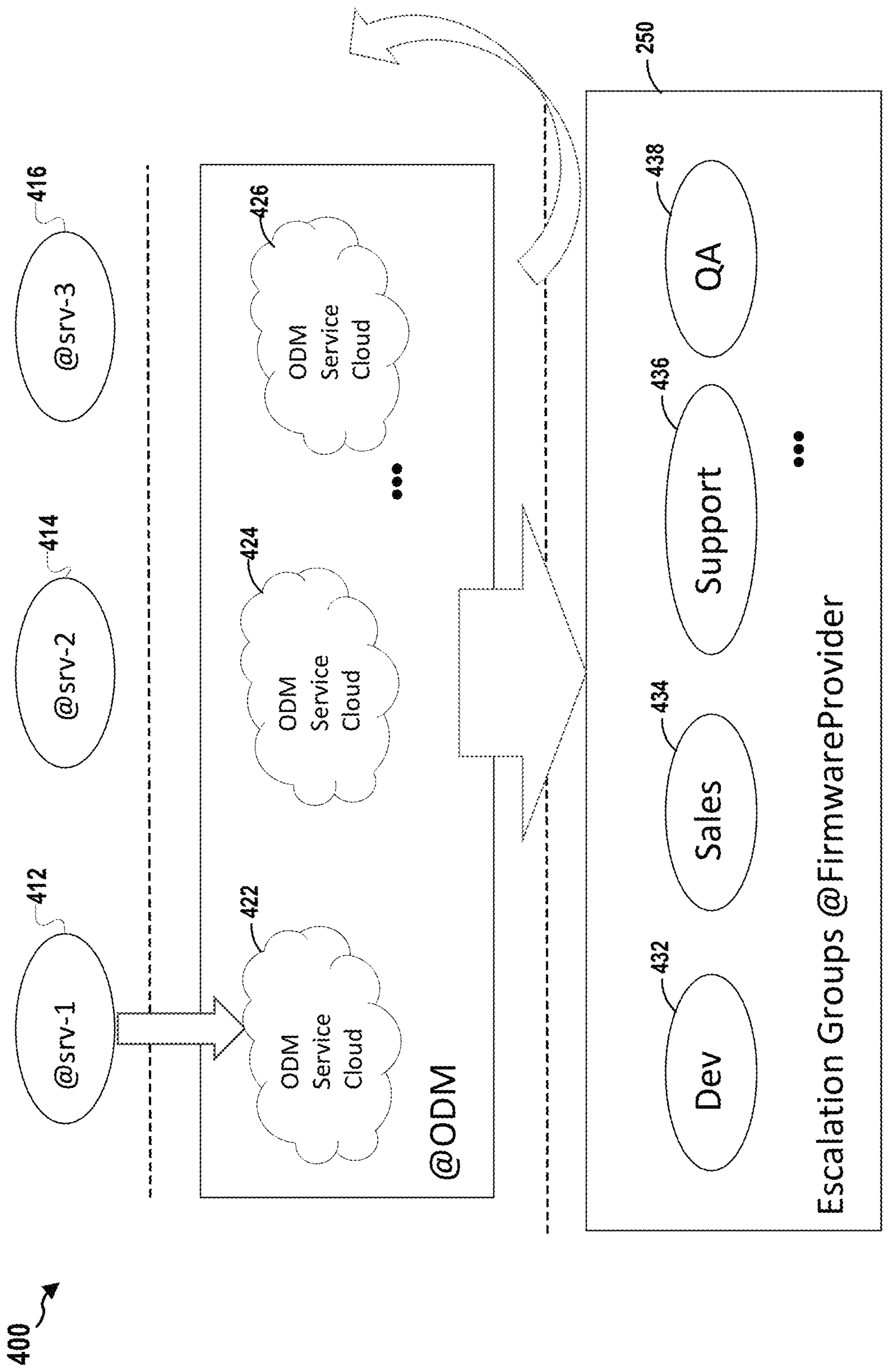
FIG. 4 is a diagram illustrating a group hierarchy and multi-level support provided by the Firmware Provider service cloud.

FIG. 4 is a diagram 400 illustrating the group hierarchy and multi-level support provided by the Firmware Provider service cloud 250 through the device social network 210. In this example, servers 412, 414, and 416 (with handles @Srv-1, @Srv-2, and @Srv-1, respectively) are supported by ODM service clouds 422, 424, and 426. These ODM service clouds are in communication with the Firmware Provider service cloud 250 through the device social network 210.

The Firmware Provider service cloud 250 provides both high-level and low-level servicing groups to cater to different levels of support based on the subscription. For example, the high-level servicing groups may include a development servicing group 432 and a QA servicing group 438, which can be directly reached for co-debugging by customers with higher-level subscriptions. On the other hand, the low-level servicing groups may include a sales servicing group 434 and a support servicing group 436, which are accessible to customers with lower-level subscriptions.

The first level of support provides standard issue searches, allowing customers to find solutions to common problems quickly. However, the Firmware Provider service cloud 250 can provide multi-level support based on the subscription level. This multi-level support is facilitated by the hierarchical structure of the servicing groups within the Firmware Provider service cloud 250.

When a server (e.g., server 412) encounters an issue, it can broadcast a message on the device social network 210, which is visible to other servers and ODM service clouds. The ODM service cloud (e.g., ODM service cloud 422) can first attempt to resolve the issue using existing solutions or manual intervention. If the problem persists, the ODM service cloud can escalate the issue to the appropriate servicing group within the Firmware Provider service cloud 250 based on the subscription level and the nature of the problem.

For instance, if the issue is related to sales or general support, it can be redirected to the sales servicing group 434 or the support servicing group 436, respectively. On the other hand, if the problem requires more technical expertise or co-debugging, it can be escalated to the development servicing group 432 or the QA servicing group 438, depending on the subscription level.

This hierarchical model allows for scalability, as ODMs can create their own layers of support, while the Firmware Provider service cloud 250 can provide multiple levels of support based on the subscription. An AI engine, if provided, within the Firmware Provider service cloud 250 can automatically redirect issues to the appropriate servicing group based on the nature of the question or problem.

The broadcasting and management of data flow are handled by this hierarchy, enabling the Firmware Provider service cloud 250 to efficiently address issues and provide targeted support to customers through the device social network 210. This model allows for the addition of complexity and further layers of support as needed.

More specifically, as shown, the hierarchy starts with the individual servers (e.g., servers 412, 414, 416) that are part of the ODM service clouds (e.g., ODM service clouds 422, 424, 426). Each server has a unique handle that allows it to communicate within the device social network.

When an issue is detected, the server can broadcast a message on the device social network. This message can be received by other servers, the ODM service clouds, and the Firmware Provider service cloud. The initial attempt to resolve the issue is made by the Level-1 support provided by the ODM service clouds. If the issue cannot be resolved at this level, it is escalated to the Firmware Provider service cloud.

The Firmware Provider service cloud has specialized groups for different types of support. The Sales Servicing Group 434 handles issues related to sales and customer inquiries. The Support Servicing Group 436 provides general technical support and troubleshooting. The development Servicing Group 432 addresses issues that require development expertise, such as software bugs or feature requests. The QA Servicing Group 438 handles quality assurance and testing-related issues.

The AI engine within the Firmware Provider service cloud can analyze the broadcasted messages, search for existing solutions in the database, and provide automated responses. If no existing solution is found, the issue is escalated to the appropriate servicing group for manual intervention.

Figure 5:
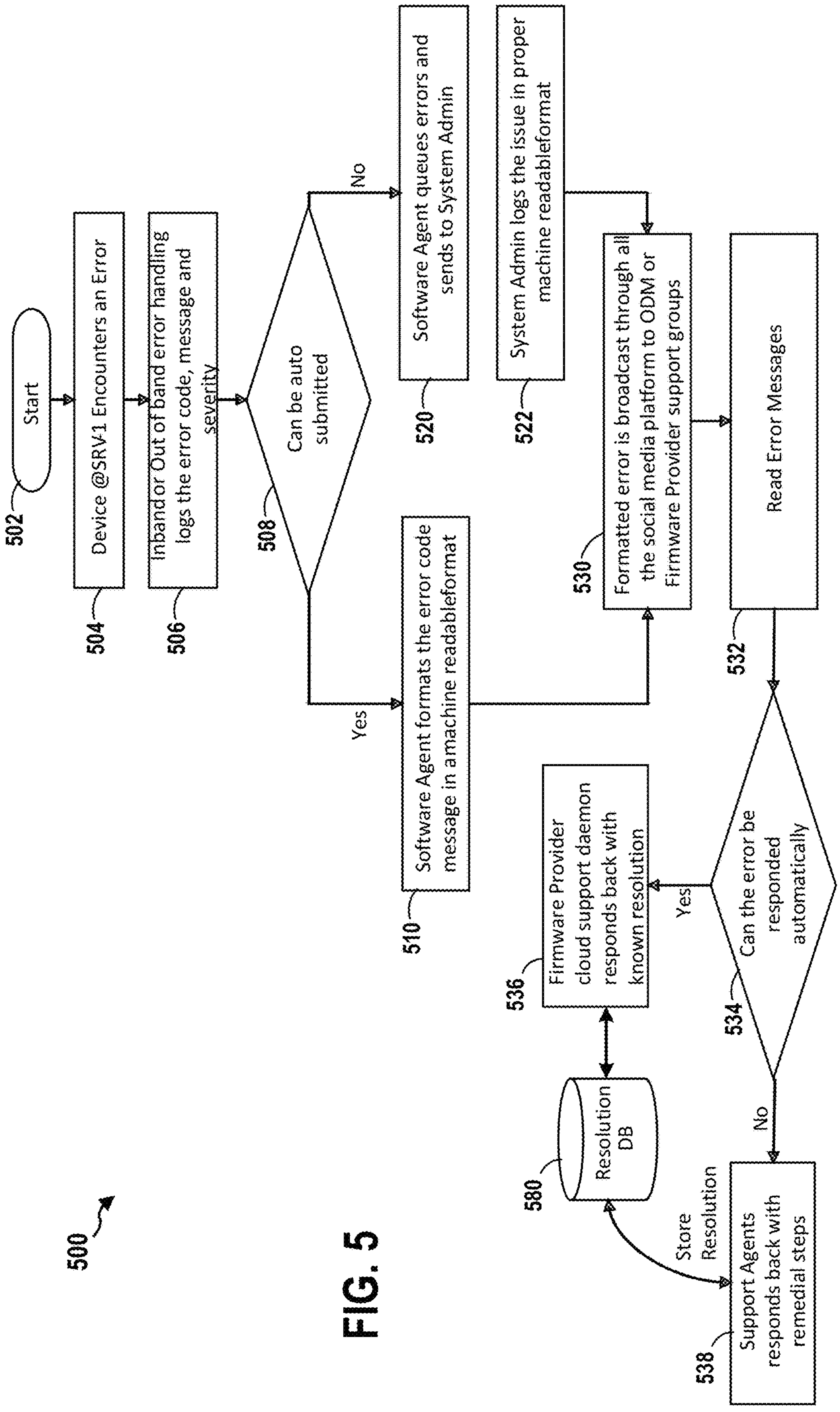
FIG. 5 is a flowchart illustrating a process for self-diagnostic and healing of enterprise nodes.

FIG. 5 is a flowchart 500 illustrating a process for self-diagnostic and healing of enterprise nodes through the device social network 210. In certain configurations, this process may be implemented by a BMC 102 in a node. The process starts in operation 502. In operation 504, a device, such as server 232 with handle @SRV-1, encounters an error. In operation 506, The BMC 102 on the server 232 detects the error through inband or out-of-band error handling and logs the error code, message, and severity.

The process then determines if the error can be auto-submitted in operation 508. If yes, a software agent running on the BMC 102 formats the error code message in a machine-readable format in operation 510. For example, the software agent may format the error information according to a pre-defined grammar that includes hashtags for easy identification and searchability. The grammar may include the definitions of the fault, error codes, and a message. The recipient may be specific support groups or individuals within the device social network 210, such as the ODM service cloud or Firmware Provider service cloud, or it can be a general broadcast to the entire network. This formatted error message is then ready to be broadcasted through the device social network 210.

As such, the message follows a specific format, as shown in the example:

From: @SVCTAG1

Message: #SensorFault ErrorCode=9123 “Sensor not detected”

Recipient: @FirmwareProviderSupport @FirmwareProviderBMCGroup

The message includes the sender's handle (@SVCTAG1), a hashtag indicating the type of fault (#SensorFault), an error code (ErrorCode=9123), and a description of the error (“Sensor not detected”). The recipient field can specify specific groups or be left empty for a general broadcast.

If the error cannot be automatically submitted, the software agent queues the errors and sends them to the system administrator in operation 520. This manual intervention allows for human oversight and assessment of the error before it is submitted to the device social network 210. For example, the software agent on the BMC 102 may queue the error and send it to the administrator of the server 232.

In operation 522, the system administrator logs the issue in a message of machine-readable format. The system administrator may use the same pre-defined grammar used in operation 510 to generate the message.

In operation 530, the formatted error is broadcast through the device social network 210 to the appropriate ODM service cloud (e.g., ODM-2 service cloud 224) or the Firmware Provider service cloud 250.

In operation 532, the ODM service cloud or the Firmware Provider service cloud 250 reads the error message. In operation 534, the process determines if the error can be responded to automatically. This decision may be based on the availability of index-based or correlation-based databases as described infra or an AI model to provide automated responses.

If yes, the Firmware Provider cloud support daemon searches the resolution database 580 and responds with a known resolution in operation 536. This resolution may include instructions, scripts, or firmware updates that address the identified error. For example, the resolution may be as follows:

From: @FirmwareProviderSupport

Message: #SensorFault "Download new BMC firmware"<url-link>

Recipient: @SVCTAG1

This resolution includes the solution ("Download new BMC firmware") and a URL link to the necessary resources.

If no automatic resolution is available, in operation 538, support agents may review the error message and provide a manual response with remedial steps. These support agents can be human operators from either the ODM service cloud or the Firmware Provider service cloud, depending on the nature of the error and the subscription level of the device. For example, the support servicing group 436 may provide a manual response The resolution, whether provided automatically or by support agents, is stored in the resolution database 580 for future reference and to enable automated responses to similar issues.

The BMC 102 on each server may detect errors as well as format and broadcast error messages. The software agent running on the BMC 102 can automatically apply resolutions received through the device social network 210, enabling end-to-end automation of the diagnostic and healing process.

Figure 6:
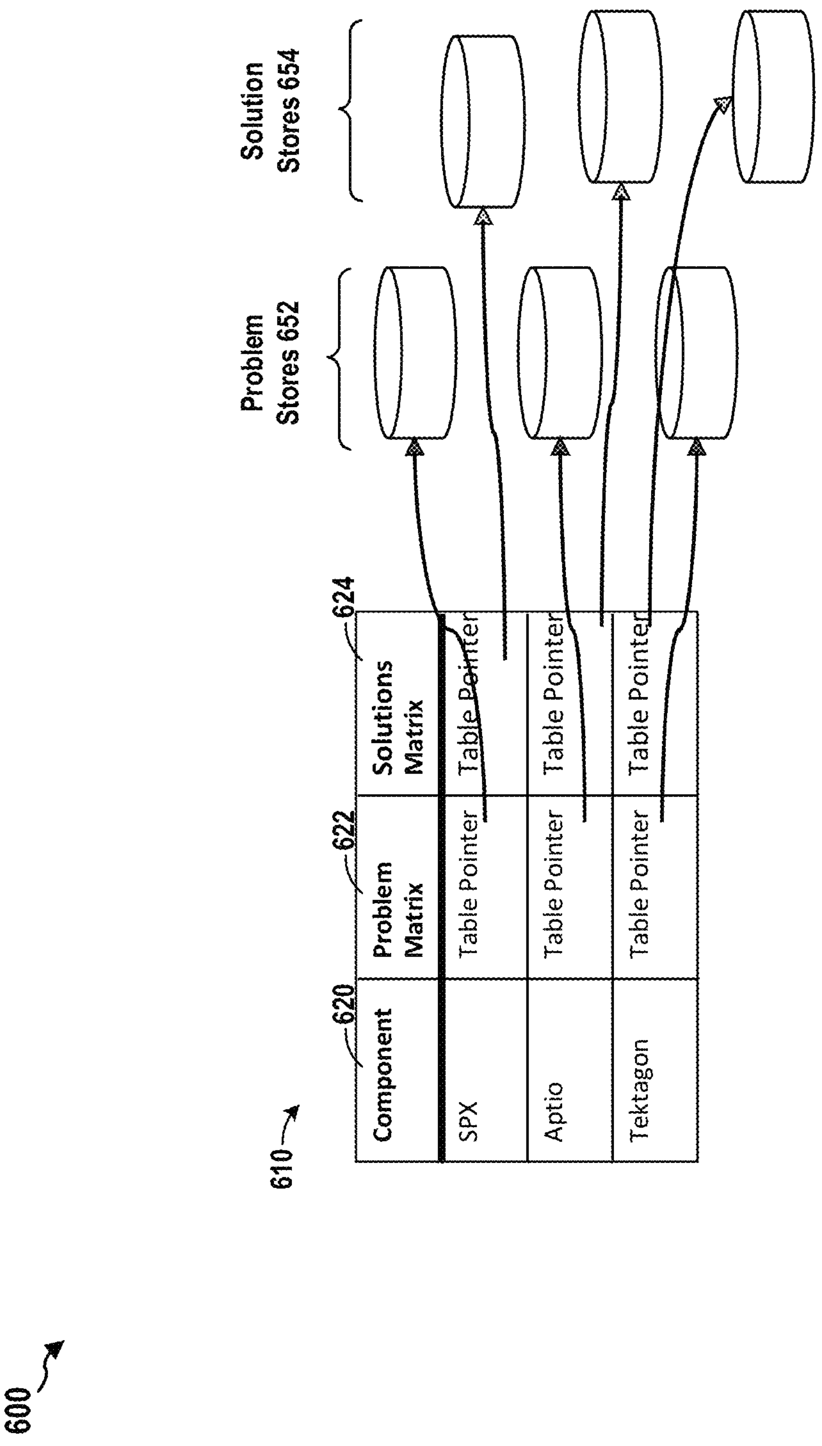
FIG. 6 is a diagram illustrating the analysis and collection of manual feedback for automated responses in the device social network.

FIG. 6 is a diagram 600 illustrating the analysis and collection of manual feedback for automated responses in the device social network 210. The diagram shows an example representation of a data structure 610 used to store and correlate problems and their associated solutions. The data structure 610 may be implemented on the Firmware Provider servers 390.

The data structure 610 includes a problem matrix 622 and a solutions matrix 624. The problem matrix 622 contains pointers to problem stores 652 for different components 620, such as SPX, Aptio, and Tektagon. Each problem associated with a particular component 620 (e.g., SPX, Aptio, Tektagon) is identified by a table pointer that directs to detailed information about the problem in the problem stores 652. The problem stores 652 store detailed information of the problems identified in the problem matrix 622. It acts as a repository for all known issues that devices may encounter.

Similarly, the solutions matrix 624 contains pointers to solution stores 654 for the corresponding components. Each solution corresponding to a problem identified in the problem matrix 622 is identified by a table pointer that directs to detailed information of a solution in the solution stores 654. The solution stores 654 store the solutions identified in the solutions matrix 624. It acts as a repository for all known resolutions to the problems stored in the problem stores 652.

As the Firmware Provider service cloud 250 collects data from the incoming and outgoing messages in the device social network 210, it can perform an analysis of the problems and their associated solutions. This data is stored in the problem stores 652 and the solution stores 654 to facilitate automated responses to future occurrences of similar issues.

The data collection may be based on a correlation-based data corpus, which can be created by an analytics tool that processes the incoming and outgoing messages. This tool may be executed on the Firmware Provider servers 390 and can identify patterns and relationships between problems and their solutions, facilitating generation of automated responses.

The collected data is indexed for easy searchability. When a new issue arises, the system can quickly search the indexed data to find relevant solutions. Based on the indexed data and correlations identified by the analytics tool, the system can provide automated responses to issues. If a solution is found in the indexed data, it is dispatched to the affected device. If no solution is found, the issue is escalated for manual resolutions. These manual resolutions are then stored in the solution stores 654 and may be used in the futures to provide automated solutions.

The problem stores 652 and the solution stores 654 are shared across the device social network 210, enabling a collaborative approach to problem-solving. For example, if a server 232 supported by the ODM-2 service cloud 224 encounters an issue that is resolved by the Firmware Provider service cloud 250, the solution is stored in the database. Later, if a server 242 supported by the ODM-1 service cloud 222 encounters a similar issue, the Firmware Provider service cloud 250 can automatically provide the solution without the need for manual intervention.

Further, a server (e.g., the server 232) may provide feedback to the Firmware Provider service cloud 250. When a solution is applied, the server can send a message confirming whether the issue has been resolved. This feedback is then used to update the database. In cases where multiple solutions are provided, the server can indicate which solution worked, and this information is used to refine the problem stores 652 and the solution stores 654 further. This continuous feedback loop helps improve the accuracy and efficiency of the automated problem-solving process.

Figure 7:
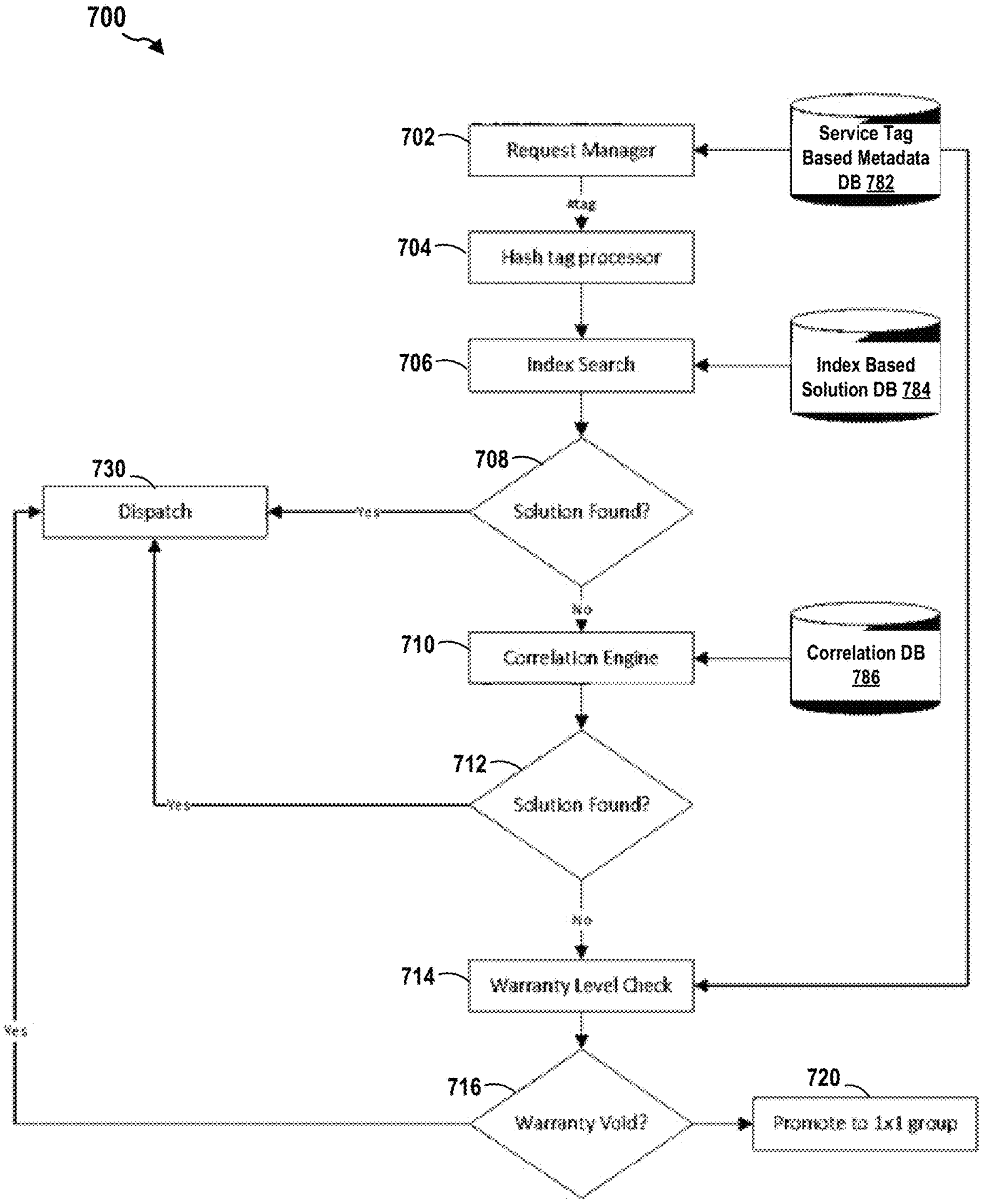
FIG. 7 is a flowchart illustrating a process for handling requests and providing solutions in the Firmware Provider service cloud.

FIG. 7 is a flowchart 700 illustrating a process for handling requests and providing solutions in the Firmware Provider service cloud 250. The Firmware Provider service cloud 250 includes a service tag based metadata database 782, an index based solution database 784, and a correlation database 786. Those databases may be implemented on the Firmware Provider servers 390.

In operation 702, a request manager, implemented on the Firmware Provider servers 390, receives a support request from a device in the device social network 210. The support request can be generated automatically by a BMC 102 on the device or manually by a system administrator. The support request indicates the type of issue, an error code, and a description of the problem. For example, the support request may be a message:

From: @SVCTAG1

Message: #SensorFault ErrorCode=9123 "Sensor not detected"

Recipient: @FirmwareProviderSupport @FirmwareProviderBMCGroup

The request includes a hashtag that identifies the type of problem the device is experiencing. In this example, the request includes the hashtag #SensorFault to indicate a problem with a sensor.

In operation 704, a hashtag processor, implemented on the Firmware Provider servers 390, extracts the hashtag from the support request. In certain configurations, the hashtag processor converts the hashtag into a hash value that can be used as an index to search the index based solution database 784.

In operation 706, the hash value is used to perform an index search on the index based solution database 784. The index based solution database 784 contains a known set of problems and their corresponding solutions. Each problem is associated with a hash value that is generated from the hashtag that describes the problem. For example, if the hashtag is "#SensorFault", the index search will search for all solutions that have been tagged with "#SensorFault."

In operation 708, the process determines if a solution is found in the index based solution database 784. If a solution is found, the process proceeds to operation 730, where the solution is dispatched to the device that sent the request.

If a solution is not found in the index based solution database 784, the process proceeds to operation 710, where a correlation engine searches the correlation database 786 for a solution. The correlation database 786 contains a correlation based data corpus that is created by an analytics tool that processes incoming and outgoing messages in the device social network 210. That is, the correlation database 786 stores information about problems and solutions that have been identified through manual feedback and analysis of historical data. The correlation engine uses this information to identify issues that are similar to the issue described in the support request, even if the hashtag or error code does not match exactly. As such, the correlation engine attempts to find a solution to the problem by identifying similar issues that have been resolved in the past.

In operation 712, the process determines if a solution is found in the correlation database 786. If a solution is found, the process proceeds to operation 730, where the solution is dispatched to the device that sent the request.

If a solution is not found in the correlation database 786, the process proceeds to operation 714, where a warranty level check is performed. The warranty level check determines the level of support the device is entitled to based on its warranty status.

In operation 716, the process determines if the warranty is void. If the warranty is void, the process proceeds to operation 720, where the request is promoted to a one-by-one group for further handling such as purchasing warranties or manual intervention.

If the warranty is not void, the issue is dispatched to a support agent for further investigation. When a solution is found, the process proceeds to operation 730, where the solution is dispatched to the device that sent the request.

Through the warranty level check, devices can receive the appropriate level of support based on their warranty status. Devices with valid warranties may receive more comprehensive support, while devices with void warranties may be promoted to a one-by-one group.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a baseboard management controller (BMC) in a host computer system connected to a device social network, comprising:

detecting an error within the host computer system, wherein the device social network is a communication platform tailored for devices to broadcast and receive messages using device social media handles in a format of domain namespace and node name, wherein the host computer system is assigned a unique device social media handle within the device social network;

automatically generating an error message that includes an error code and a description of the error; and when the error message is allowed to be automatically submitted to the device social network:

broadcasting the error message with the unique device social media handle to the device social network for receipt by a plurality of other computing devices identifiable on the device social network by a corresponding plurality of social media handles; and receiving a response message from the device social network, wherein the response message includes at least one of a solution to the error and a notification regarding the error.

2. The method of claim 1, wherein the response message includes the solution, and wherein the method further comprises:

applying the solution to the host computer system to resolve the error.

3. The method of claim 1, wherein the error message is generated in a machine-readable format that includes a hashtag indicative of an error type.

4. The method of claim 1, wherein the error message is generated according to a predefined grammar that facilitates automated parsing and response by the support cloud.

5. The method of claim 1, wherein the solution includes at least one of: an instruction, a script, or a reference to a firmware update.

6. The method of claim 1, wherein the error message includes a recipient field specifying at least one of a support group and a support device.

7. The method of claim 1, further comprising:

queuing the error message for review by a system administrator, when the error message is not allowed to be automatically submitted to the device social network.

8. A method of operation of a support computer system, comprising:

receiving, via a device social network, an error message from a first host computer system of a plurality of host computer systems, the error message including an error code and a description of the error, wherein the device social network is a communication platform tailored for the plurality of host computer systems to broadcast and receive messages using device social media handles in a format of domain namespace and node name, wherein the first host computer system is assigned a unique device social media handle within the device social network, and wherein the error message is broadcast with the unique device social media handle and is received from the device social network;

searching an index-based solution database for a solution associated with the error code;

searching a correlation database for the solution when the solution is not found in the index-based solution database; and dispatching the solution to the first host computer system when the solution is found in at least one of the index-based solution database and the correlation database.

9. The method of claim 8, further comprising:

forwarding the error message to a support agent when the solution is not found in the index-based solution database and the correlation database.

10. The method of claim 9, further comprising:

storing the solution in the index-based solution database when the solution is provided by the support agent.

11. The method of claim 9, further comprising:

performing a warranty level check to determine a level of support for the first host computer system based on a warranty status of the first host computer system.

12. The method of claim 8, further comprising:

extracting a hashtag from the error message; and converting the hashtag into a hash value, wherein searching the index-based solution database comprises using the hash value to search the index-based solution database.

13. The method of claim 8, wherein searching the correlation database comprises:

identifying issues similar to the error based on a correlation-based data corpus created by an analytics tool that processes incoming and outgoing messages in the device social network.

14. The method of claim 8, further comprising:

receiving feedback from the first host computer system indicating whether the solution resolved the error; and updating at least one of the index-based solution database and the correlation database based on the feedback.

15. The method of claim 8, wherein the device social network is configured to facilitate communication between the plurality of host computer systems and the support computer system using a hierarchical structure of device handles.

16. The method of claim 8, wherein the plurality of host computer systems are initially supported by at least one original design manufacturer (ODM) service cloud, and wherein the support computer system is part of a Firmware Provider service cloud.

17. The method of claim 16, wherein the at least one ODM service cloud provides a first level of support, and wherein the Firmware Provider service cloud provides a second level of support.

18. The method of claim 8, wherein the support computer system comprises a plurality of servicing groups, each servicing group configured to handle a specific type of error message.

19. A baseboard management controller (BMC), in a host computer system connected to a device social network, comprising:

a processor; and a memory coupled to the processor, wherein the processor is configured to:

detect an error within the host computer system, wherein the device social network is a communication platform tailored for devices to broadcast and receive messages using device social media handles in a format of domain namespace and node name, wherein the host computer system is assigned a unique device social media handle within the device social network;

automatically generate an error message that includes an error code and a description of the error; and when the error message is allowed to be automatically submitted to the device social network:

broadcast the error message with the unique device social media handle to the device social network for receipt by a plurality of other computing devices identifiable on the device social network by a corresponding plurality of social media handles; and receive a response message from the device social network, wherein the response message includes at least one of a solution to the error and a notification regarding the error.

* * * * *